(12) United States Patent
Wakabayashi

(10) Patent No.: US 10,598,989 B2
(45) Date of Patent: Mar. 24, 2020

(54) LIQUID CRYSTAL APPARATUS AND ELECTRONIC APPARATUS

(71) Applicant: SEIKO EPSON CORPORATION, Tokyo (JP)

(72) Inventor: Junichi Wakabayashi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/287,959

(22) Filed: Feb. 27, 2019

(65) Prior Publication Data

US 2019/0265535 A1 Aug. 29, 2019

(30) Foreign Application Priority Data

Feb. 28, 2018 (JP) .................................. 2018-034412

(51) Int. Cl.
*G02F 1/1335* (2006.01)
*G02F 1/13363* (2006.01)
*G03B 21/00* (2006.01)
*G02F 1/1333* (2006.01)
*G03B 33/12* (2006.01)

(52) U.S. Cl.
CPC .... *G02F 1/13363* (2013.01); *G02F 1/133345* (2013.01); *G03B 21/006* (2013.01); *G03B 33/12* (2013.01)

(58) Field of Classification Search
None
See application file for complete search history.

(56) References Cited

FOREIGN PATENT DOCUMENTS

JP 2013-174649 A 9/2013

*Primary Examiner* — Richard H Kim
(74) *Attorney, Agent, or Firm* — Oliff PLC

(57) ABSTRACT

In a liquid crystal apparatus, a second substrate is provided with a base layer and an optical compensation layer. A surface of the base layer faces a first substrate and is provided with a plurality of first inclined surfaces. A surface of the optical compensation layer faces the first substrate and is provided with a plurality of second inclined surfaces having a shape reflected with a shape of the plurality of first inclined surfaces. The base layer is provided with boundary grooves between adjacent ones of the first inclined surfaces. The plurality of first inclined surfaces each have a high portion having a maximum height and a low portion having a minimum height when viewed from the second substrate. The high portion is provided with a second flat portion. Between the second flat portion and the low portion, an inclined portion having a height continuously changing is provided.

10 Claims, 16 Drawing Sheets

LIQUID CRYSTAL APPARATUS AND ELECTRONIC APPARATUS

BACKGROUND

1. Technical Field

The invention relates to a liquid crystal apparatus and an electronic apparatus. The liquid crystal apparatus includes an optical compensation element.

2. Related Art

A liquid crystal display apparatus is provided with a liquid crystal layer between a first substrate having a surface provided with a first electrode and a first oriented film and a second substrate provided with a second electrode and a second oriented film. To achieve high speed driving and high contrast capability, such a liquid crystal material has mainly been used that is a liquid crystal material (Vertical Alignment (VA) type) provided with a liquid crystal layer having negative dielectric anisotropy. In such a liquid crystal apparatus, liquid crystal molecules are generally pre-tilted by a first oriented film and a second oriented film to allow a long axis direction of the liquid crystal molecules to incline with respect to a normal line direction of a first substrate and a second substrate.

On the other hand, in a VA-type liquid crystal apparatus, due to a pre-tilt angle, as well as due to dielectric anisotropy and refractive index anisotropy of a liquid crystal material, light passed through a liquid crystal layer would become elliptically polarized light, causing the light to leak. As a result, contrast lowers. Such a technique has been adopted that provides an optical compensation plate in addition to a liquid crystal panel to cancel out retardation. However, to provide the optical compensation plate, angle of the optical compensation plate is required to be adjusted while driving a liquid crystal apparatus and observing transmittance, leading to a greater effort for the adjustment.

Such a technique has been proposed that an optical compensation layer having inclined surfaces is provided on either of a first substrate and a second substrate as a negative C plate to incorporate an optical compensation element into a liquid crystal apparatus (see JP-A-2013-174649). More specifically, a gray scale mask, for example, is used to form a resist having triangular shapes in cross section on a surface of a base layer. In this state, dry etching is performed. After a plurality of inclined surfaces are formed on the base layer, an optical compensation layer is laminated.

In the configuration described in JP-A-2013-174649, however, when a gray scale mask, for example, is used to form a resist having triangular shapes in cross section onto a surface of a base layer, tops of the triangular shapes might not be sharpened. As a result, wall surfaces respectively lying opposite to inclined surfaces with respect to high portions become slopes inclined opposite to the inclined surfaces. With this configuration, elliptically polarized light components increase in light entered into the slopes inclined opposite to the inclined surfaces, lowering display quality.

SUMMARY

An advantage of some aspects of the invention is to provide a liquid crystal apparatus capable of incorporating an optical compensation layer keeping an appropriate shape, an electronic apparatus, and a method for producing the liquid crystal apparatus.

For the issue described above, a liquid crystal apparatus according to an aspect of the invention includes a first substrate, a second substrate, and a liquid crystal layer. The second substrate is provided with a base layer and an optical compensation layer. A surface of the base layer faces the first substrate and is provided with a plurality of first inclined surfaces. The optical compensation layer is laminated on the base layer. A surface of the optical compensation layer faces the first substrate and is provided with a plurality of second inclined surfaces reflected with a shape of the plurality of first inclined surfaces. The liquid crystal layer is provided between the first substrate and the second substrate. The base layer is provided with boundary grooves between adjacent ones of the plurality of first inclined surfaces. The plurality of first inclined surfaces each have a high portion having a maximum height, a low portion having a minimum height when viewed from the second substrate, and an inclined portion having the height continuously changing between the high portion and the low portion.

In the liquid crystal apparatus according to the invention, the base layer is provided with boundary grooves between adjacent ones of the first inclined surfaces. A wall surface lying opposite to the inclined portion with respect to the high portion corresponds to an inner wall of each of the boundary grooves. Therefore, the wall surface lying opposite to the inclined portion with respect to the high portion would be less likely to have a shape inclined opposite to the inclined portion. Therefore, when the optical compensation layer is laminated onto the base layer, the optical compensation layer keeps an appropriate shape. Therefore, according to the invention, the optical compensation layer can appropriately compensate elliptically polarized light components.

A method for producing a liquid crystal apparatus including a first substrate, a second substrate, and a liquid crystal layer provided between the first substrate and the second substrate, according to another aspect of the invention, includes a first process configured to film-form a first sacrificing layer onto a base layer on a surface of the second substrate, a second process configured to form, by etching the base layer from the first sacrificing layer, a plurality of boundary grooves extending in two directions intersecting with each other, a third process configured to form a mask layer covering a surface of the first sacrificing layer and inner walls of the boundary grooves, a fourth process configured to form, on the mask layer, openings around ends of areas surrounded by the plurality of boundary grooves, a fifth process configured to form, by performing wet etching from the openings onto the first sacrificing layer and the base layer under a condition that an etching speed for the first sacrificing layer is greater than an etching speed for the base layer, inclined portions each having a height from the second substrate continuously increasing from a position adjacent to each of the openings to a position away from each of the openings onto the base layer, a sixth process configured to remove the mask layer, and an optical compensation layer forming process configured to laminate an optical compensation layer onto a surface of the base layer.

In the method for producing the liquid crystal apparatus, according to the invention, after the first sacrificing layer is film-formed onto the base layer of the second substrate in the first process, the base layer is etched from the first sacrificing layer in the second process to substantially vertically form in a depth direction the plurality of boundary grooves extending in the two directions intersecting with each other. After the mask layer is formed in the third process, the openings are formed on the mask layer around the ends of the areas surrounded by the plurality of boundary grooves in the fourth process. In the fifth process, the first sacrificing layer and the base layer are wet-etched from the openings to form the inclined portions each having a height from the second substrate continuously increasing from a position adjacent to each of the openings to a position away from each of the openings onto the base layer. Therefore, the wall surfaces respectively lying opposite to the inclined portions with respect to the high portions serve as inner walls of the boundary grooves substantially vertically formed through anisotropic etching, for example. Thus, different from a case when, after a gray scale mask, for example, is used to form a resist having triangular shapes in cross section onto a surface of the base layer, etching is performed, such an event would be less likely to occur that the wall surfaces respectively lying opposite to the inclined portions with respect to the high portions become slopes inclined opposite to the first inclined surfaces. Thus, the optical compensation layer keeping an appropriate shape can be provided. Elliptically polarized light components can be appropriately compensated.

In the liquid crystal apparatus according to the invention, such an aspect may be adopted that, on the inclined portion, contour lines each coupling positions identical to each other in height are respectively curved into arc shapes about the low portion.

In the liquid crystal apparatus according to the invention, such an aspect may be adopted that the plurality of first inclined surfaces each have a first flat portion at the low portion.

In the liquid crystal apparatus according to the invention, such an aspect may be adopted that the plurality of first inclined surfaces each have a curved surface portion having a concave shape between the first flat portion and the inclined portion.

In the method for producing the liquid crystal apparatus, according to the invention, such an aspect may be adopted that, in the fifth process, the first sacrificing layer is removed from the areas surrounded by the plurality of boundary grooves. In this case, the high portions are respectively formed with sharp tip portions. Therefore, the inclined portions can be advantageously expanded in area.

In the method for producing the liquid crystal apparatus, according to the invention, such an aspect may be adopted that, in the fifth process, the first sacrificing layer at positions most distant from the openings is left behind in the areas surrounded by the plurality of boundary grooves. According to the aspect, second flat portions are respectively formed onto the high portions. In this case, such an aspect may be adopted that, between the sixth process and the optical compensation layer forming process, a seventh process configured to remove the first sacrificing layer from the surface of the base layer is performed.

In the method for producing the liquid crystal apparatus, according to the invention, such an aspect may be adopted that, between the sixth process and the optical compensation layer forming process, an eighth process configured to form a second sacrificing layer onto the surface of the base layer, and a ninth process configured to etch the second sacrificing layer and the base layer under a condition that an etching speed for the second sacrificing layer is greater than an etching speed for the base layer are performed. According to the aspect, an angle of the inclined portions formed onto the base layer can be adjusted to a smaller angle.

In the liquid crystal apparatus according to the invention, such an aspect may be adopted that the plurality of first inclined surfaces each have a square flat shape having the high portion and the low portion at diagonal positions.

The liquid crystal apparatus according to the invention can be used for electronic apparatuses including cellular phones, mobile computers, and projection-type display apparatuses, for example. Among the electronic apparatuses, the projection-type display apparatuses each include a light source configured to supply light to a liquid crystal apparatus, and a projection optical system configured to project light optically modulated by the liquid crystal apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
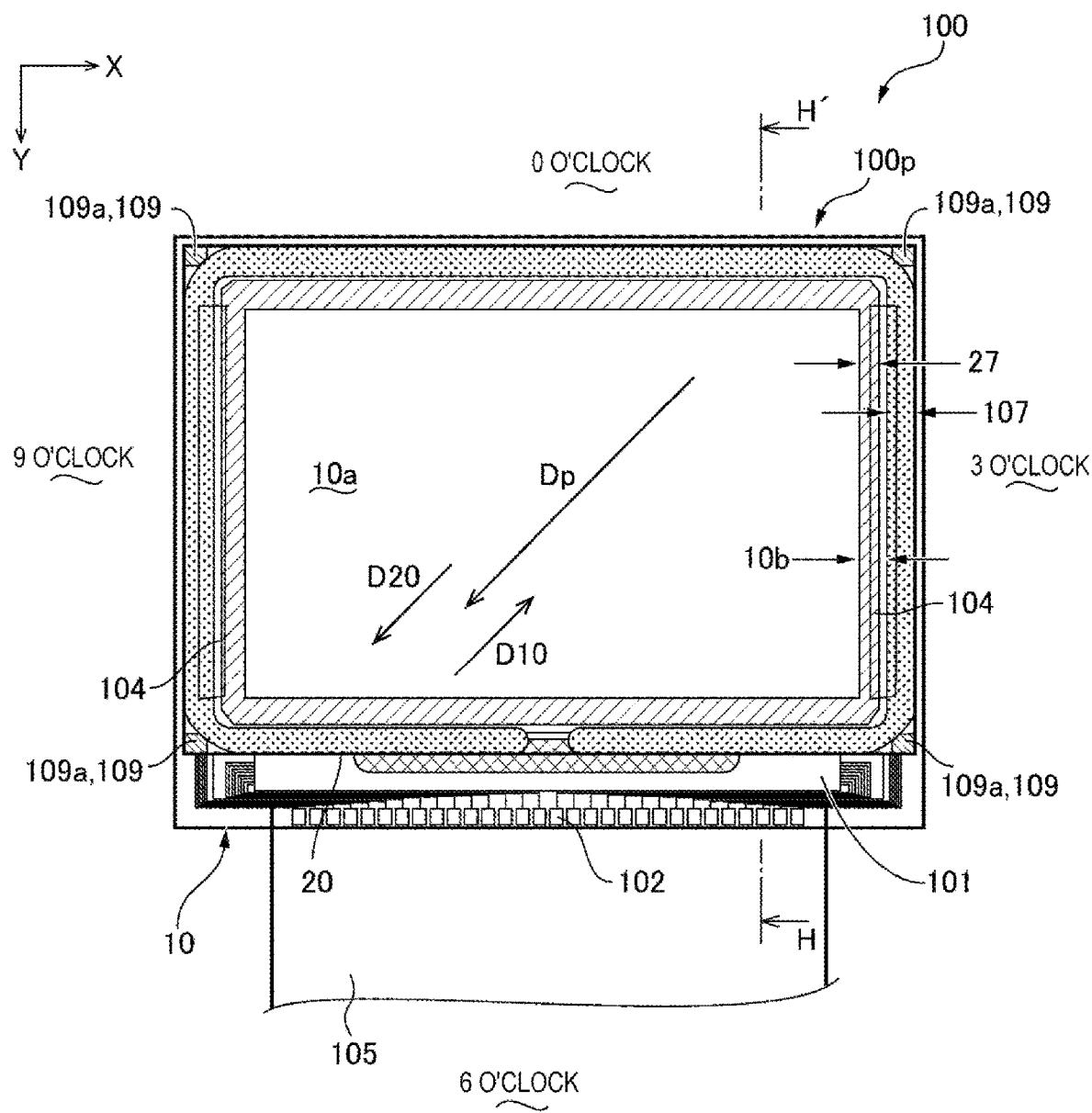
FIG. 1 is a plan view of a liquid crystal panel of a liquid crystal apparatus to which the invention is applied.

Exemplary embodiments of the invention will be described with reference to the drawings. Note that in the drawings referred to in the description below, to illustrate each layer or each member at a recognizable size, each layer or each member is illustrated in a different scale.

Configuration of Liquid Crystal Apparatus Overall Configuration

Figure 2:
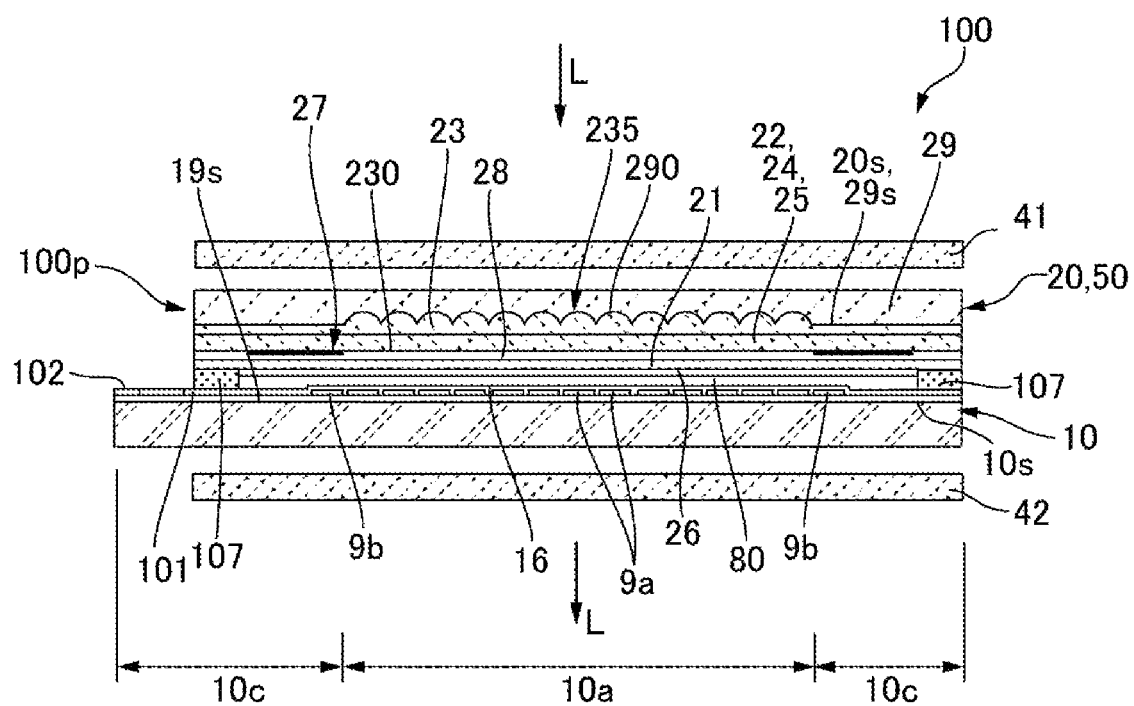
FIG. 2 is a cross-sectional view of the liquid crystal panel, for example, illustrated in FIG. 1.

FIG. 1 is a plan view of a liquid crystal panel 100p of a liquid crystal apparatus 100 to which the invention is applied. FIG. 2 is a cross-sectional view of the liquid crystal panel 100p, for example, illustrated in FIG. 1. As illustrated in FIGS. 1 and 2, the liquid crystal apparatus 100 includes the liquid crystal panel 100p including a first substrate 10 and a second substrate 20 applied to each other by a sealing material 107 in a predetermined gap. In the liquid crystal panel 100p, the sealing material 107 is provided in a frame shape in circumference with an outer edge of the second substrate 20. Between the first substrate 10 and the second substrate 20, a liquid crystal layer 80 is disposed in an area surrounded by the sealing material 107. The sealing material 107, which includes an adhesive having a photocurable property or an adhesive having both a photocurable property and a thermosetting property, is made containing a glass fiber, or a gap material such as a glass bead for setting the distance between the substrates to a predefined value. The first substrate 10 and the second substrate 20 are each shaped into a quadrangular shape. At a substantially center of the liquid crystal apparatus 100, a display area 10a described later is provided. The display area 10a has a quadrangular area, is arranged with a plurality of pixels, and is surrounded by a peripheral area 10c. In the exemplary embodiment, in the peripheral area 10c, areas adjacent to the display area 10a are formed with dummy pixel electrodes 9b simultaneously formed with first electrodes 9a.

The first substrate 10 is made from a transmissive substrate such as a quartz substrate or a glass substrate. The first substrate 10 has a surface 10s facing the second substrate 20. The peripheral area 10c on the surface 10s is formed with a data line driving circuit 101 and a plurality of terminals 102 along a side of the first substrate 10. The side extends in a first direction X. Adjacent to the side, scanning line driving circuits 104 are respectively formed along two sides extending in a second direction Y. A flexible wiring substrate (not illustrated) is coupled to the terminals 102, and a variety of potentials and signals are input to the first substrate 10 via the flexible wiring substrate.

The display area 10a on the surface 10s of the first substrate 10 is provided with the first electrodes 9a and a first oriented film 16. The first electrodes 9a are transmissive and made from an Indium Tin Oxide (ITO) film, for example. The first oriented film 16 covers the first electrodes 9a. In the exemplary embodiment, the first electrodes 9a serve as a plurality of pixel electrodes respectively provided in the pixels.

The second substrate 20 is made from a transmissive substrate such as a quartz substrate or a glass substrate. The second substrate 20 has a surface 20s facing the first substrate 10. The surface 20s is formed with a second electrode 21 that is transmissive and made from an ITO film, for example. A second oriented film 26 is formed adjacent to the first substrate 10 with respect to the second electrode 21. The second electrode 21 serves as a common electrode formed substantially wholly over the second substrate 20, and is covered by the second oriented film 26. Adjacent to the surface 20s of the second substrate 20, i.e., opposite to the first substrate 10 with respect to the second electrode 21, a light-shielding layer 27 is formed. The light-shielding layer 27 is made of resin, metal, or a metal compound to have light-shielding properties. Between the light-shielding layer 27 and the second electrode 21, a protective layer 28 that is transmissive is formed. The light-shielding layer 27 is formed as a parting extending along an outer circumference edge of the display area 10a. The display area 10a is defined by an inner edge of the light-shielding layer 27. The light-shielding layer 27 may be formed in a black matrix in areas overlapping, when viewed in a plan view, with areas each between adjacent ones of the first electrodes 9a.

The first oriented film 16 and the second oriented film 26 are organic oriented films made of polyimide, for example, or inorganic oriented films made of $SiO_x$ (x<2), for example. In the first oriented film 16 and the second oriented film 26, liquid crystal molecules having negative dielectric anisotropy used in the liquid crystal layer 80 are substantially vertically oriented. In this way, the liquid crystal apparatus 100 serves as a VA-mode liquid crystal apparatus.

The second substrate 20 is formed as a lens array substrate 50 formed with a plurality of lenses 235 overlapping a plurality of the first electrodes 9a when viewed in a plan view in a one-to-one relationship. The lenses 235 are configured to effectively guide light onto an opening area of the pixels of the first substrate 10. To form the lenses 235, a surface 29s of a substrate main body 29 of the second substrate 20 (the surface 20s of the second substrate 20) is formed with recessed curved surfaces 290 at positions overlapping the plurality of first electrodes 9a one by one. The substrate main body 29 is formed with a lens layer 23 covering the recessed curved surfaces 290. A surface 230 of the lens layer 23 lies opposite to the substrate main body 29, and is formed flat. Between the surface 230 and the protective layer 28, a base layer 22, an optical compensation layer 25, and a light-transmission layer 24 described later, for example, are formed. The lens layer 23 has a greater refractive index than the substrate main body 29. For example, the substrate main body 29 is made from a glass substrate or a quartz substrate (refractive index=1.48). The lens layer 23 is made from a silicon oxynitride film (refraction=from 1.58 to 1.68), for example. Therefore, the lenses 235 have positive power.

In the peripheral area 10c of the first substrate 10, inter-substrate conduction electrodes 109 are formed in areas overlapping corner portions of the second substrate 20. Inter-substrate conduction materials 109a containing conductive particles are disposed at the inter-substrate conduction electrodes 109. The second electrode 21 of the second substrate 20 is electrically coupled to the first substrate 10 via the inter-substrate conduction materials 109a and the inter-substrate conduction electrodes 109. Therefore, a common potential is applied to the second electrode 21 from the first substrate 10.

In the liquid crystal apparatus 100 according to the exemplary embodiment, the first electrodes 9a and the second electrode 21 are made of an ITO film (transmissive conductive film). The liquid crystal apparatus 100 thus serves as a transmissive liquid crystal apparatus. The liquid crystal apparatus 100 displays an image in a manner that, while light entering from the second substrate 20, as indicated by an arrow L in FIG. 2, passes through and exits from the first substrate 10, the light is modulated by the liquid crystal layer 80 for each of the pixels.

When the liquid crystal apparatus 100 is used in an electronic apparatus such as a projection-type display apparatus, a first polarized light element 41 is disposed adjacent to the second substrate 20, while a second polarized light element 42 is disposed adjacent to the first substrate 10. The first polarized light element 41 and the second polarized light element 42 are disposed in a crossed Nichol manner to allow respective polarized light axes to be orthogonal to each other.

Configuration of Liquid Crystal Layer 80 and Other Components

Figure 3:
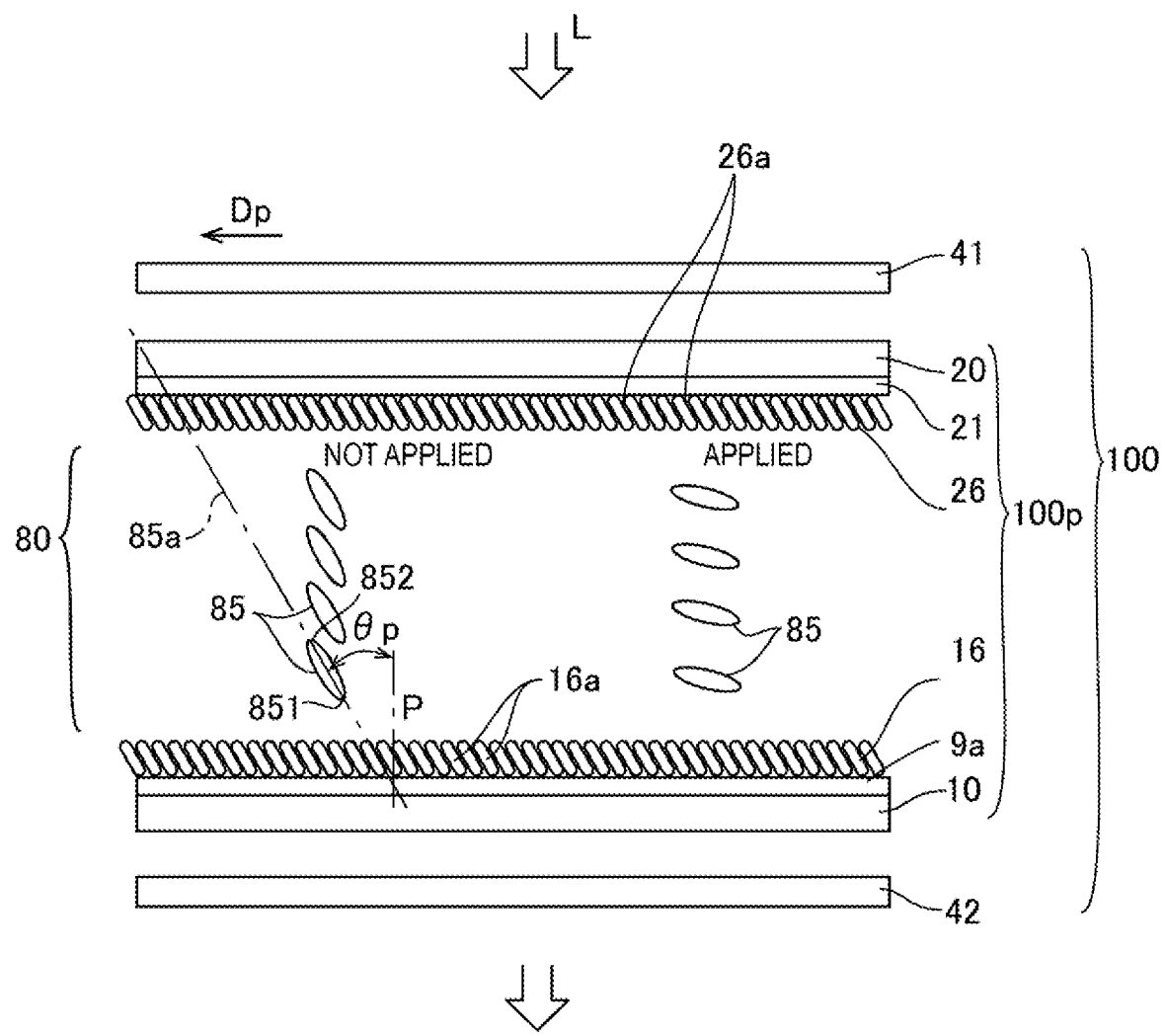
FIG. 3 is an explanatory view of liquid crystal molecules, for example, used in a liquid crystal layer of the liquid crystal apparatus illustrated in FIG. 1.
Figure 4:
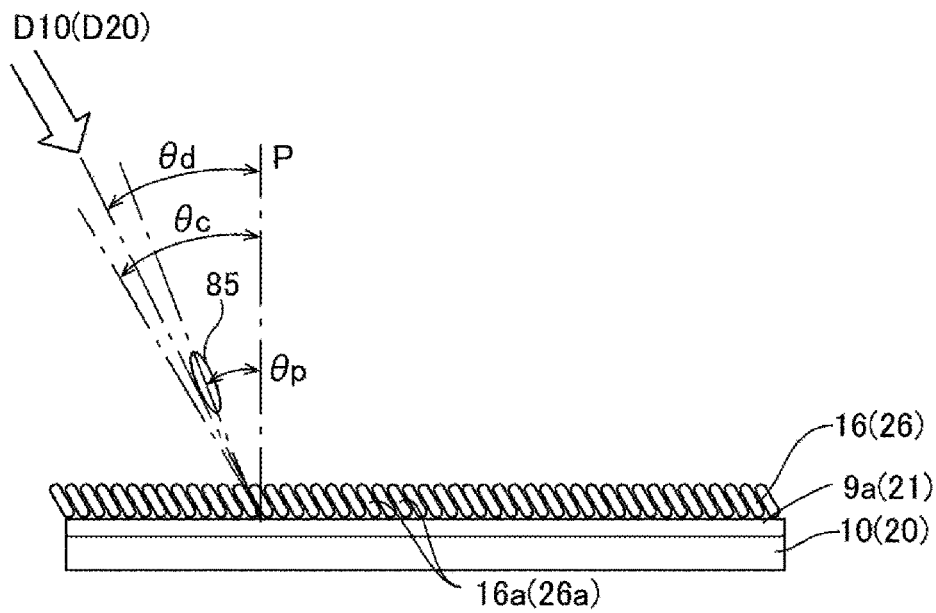
FIG. 4 is an explanatory view of a method, for example, for forming a first oriented film and a second oriented film of the liquid crystal apparatus illustrated in FIG. 1.

FIG. 3 is an explanatory view of liquid crystal molecules 85, for example, used in the liquid crystal layer 80 of the liquid crystal apparatus 100 illustrated in FIG. 1. FIG. 4 is an explanatory view of a method, for example, for forming the first oriented film 16 and the second oriented film 26 of the liquid crystal apparatus 100 illustrated in FIG. 1.

In the exemplary embodiment, the first oriented film 16 and the second oriented film 26 illustrated in FIG. 2 are oblique deposition films (inorganic oriented films) made of $SiO_x$ (x<2), $SiO_2$, $TiO_2$, MgO, or $Al_2O_3$, for example. Therefore, as illustrated in FIG. 3, the first oriented film 16 and the second oriented film 26 respectively have columnar structure bodies having columnar bodies 16a and 26a referred to as columns respectively formed diagonally with respect to the first substrate 10 and the second substrate 20. Thus, in the first oriented film 16 and the second oriented film 26, the liquid crystal molecules 85 used in the liquid crystal layer 80 are oriented diagonally with respect to the first substrate 10 and the second substrate 20 to allow the liquid crystal molecules 85 to be pre-tilted. While no voltage is applied between the first electrodes 9a and the second electrode 21, a pre-tilt angle θp denotes an angle formed between a normal line direction P with respect to the first substrate 10 and the second substrate 20 and a long axis direction (orientation direction) of the liquid crystal molecules 85. The pre-tilt angle θp substantially ranges from 3° to 5°, for example. In the exemplary embodiment, a positive tilt is applied. Under the positive tilt, the liquid crystal molecules 85 and the columnar bodies 16a and 26a are inclined in an identical direction.

A pre-tilt orientation Dp of the liquid crystal molecules 85 represents an orientation toward which an end 852, adjacent to the second substrate 20, of each of the liquid crystal molecules 85 in a long axis direction 85a faces, with respect to an end 851, adjacent to the first substrate 10, of each of the liquid crystal molecules 85. In the liquid crystal apparatus 100, when a drive voltage is applied between the first electrodes 9a and the second electrode 21, the liquid crystal molecules 85 incline in the pre-tilt orientation Dp.

The liquid crystal panel 100p is disposed between the pair of polarized light elements disposed in a crossed Nichol manner to allow the pre-tilt orientation Dp to form an angle of 45° with respect to a transmission axis or an absorption axis of the polarized light elements.

In the exemplary embodiment, for example, as illustrated in FIG. 1, an orientation D10 representing a deposition direction when the first oriented film 16 is formed heads from 0730 o'clock to 0130 o'clock, for example. At that time, a direction in which the columnar bodies 16a grow heads from 0130 o'clock to 0730 o'clock. An orientation D20 representing a deposition direction when the second oriented film 26 is formed heads from 0130 o'clock to 0730 o'clock. At that time, a direction in which the columnar bodies 26a grow heads from 0730 o'clock to 0130 o'clock. Therefore, the pre-tilt orientation Dp of the liquid crystal molecules 85 heads from 0130 o'clock to 0730 o'clock. The pre-tilt orientation Dp intersects with the first direction X and the second direction Y, respectively, at an angle of 45°.

As illustrated in FIG. 4, to form the first oriented film 16, deposition is performed in the orientation D10. At that time, the deposition is performed diagonally at an angle θd from the normal line direction P with respect to the first substrate 10. As a result, in the first oriented film 16, the columnar bodies 16a are formed diagonally at an angle θc with the normal line direction P with respect to the first substrate 10. At that time, the angle θc of the columnar bodies 16a is not always identical to the angle θd of the deposition. However, the angle θc of the columnar bodies 16a is controlled by the angle θd of the deposition.

The liquid crystal molecules 85 are pre-tilted by an orientation restriction force of the first oriented film 16. At that time, the pre-tilt angle θp is not always identical to the angle θc of the columnar bodies 16a. However, the pre-tilt angle θp is controlled by the angle θc of the columnar bodies 16a. Therefore, the pre-tilt angle θp is controlled by the angle θd of the deposition.

The second oriented film 26 has a configuration identical to the configuration of the first oriented film 16. Therefore, like numbers in parentheses reference like components in FIG. 4, and description of the like components are omitted.

Configuration of Optical Compensation Layer 25

Figure 5:
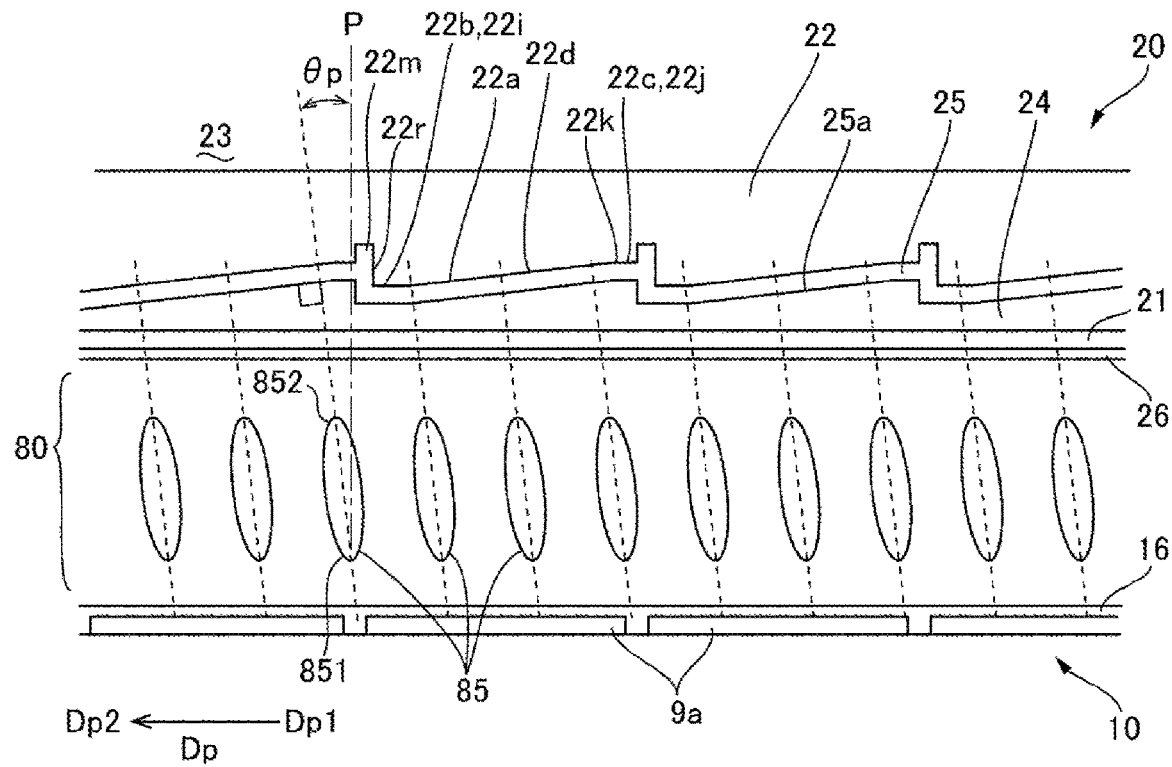
FIG. 5 is an explanatory view of an optical compensation layer, for example, of the liquid crystal apparatus illustrated in FIG. 1.
Figure 6:
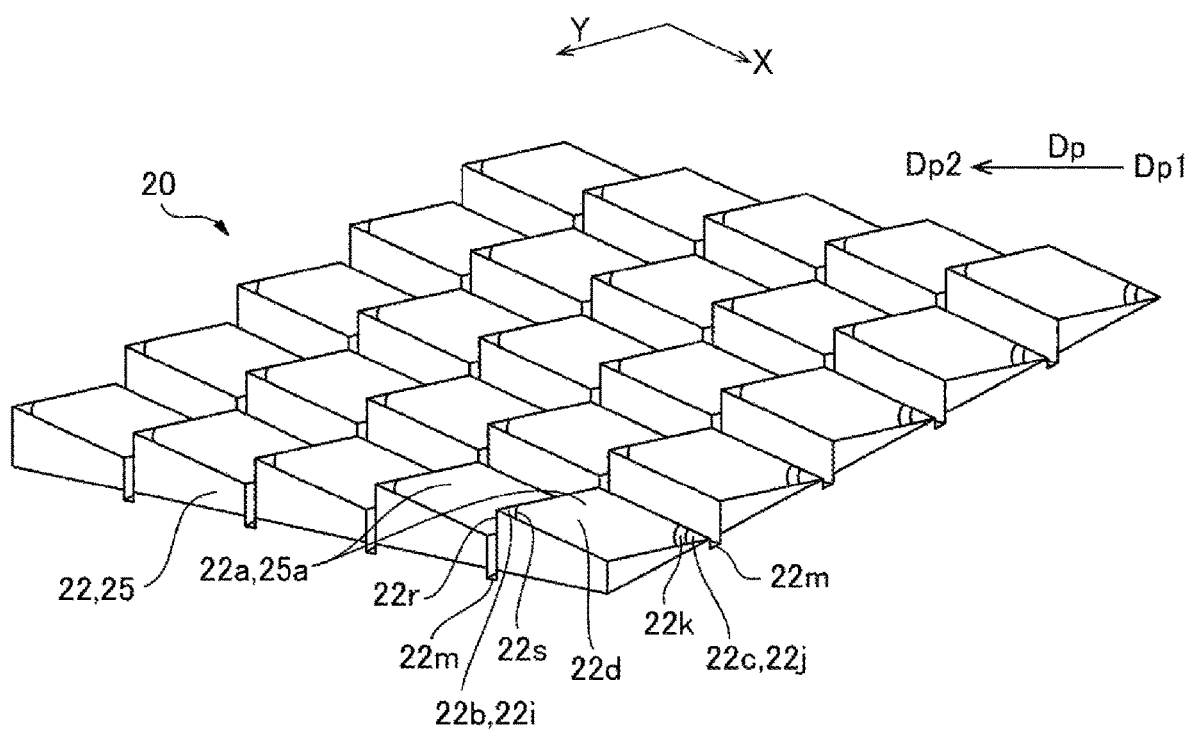
FIG. 6 is an explanatory view illustrating a shape of the optical compensation layer illustrated in FIG. 7.
Figure 7:
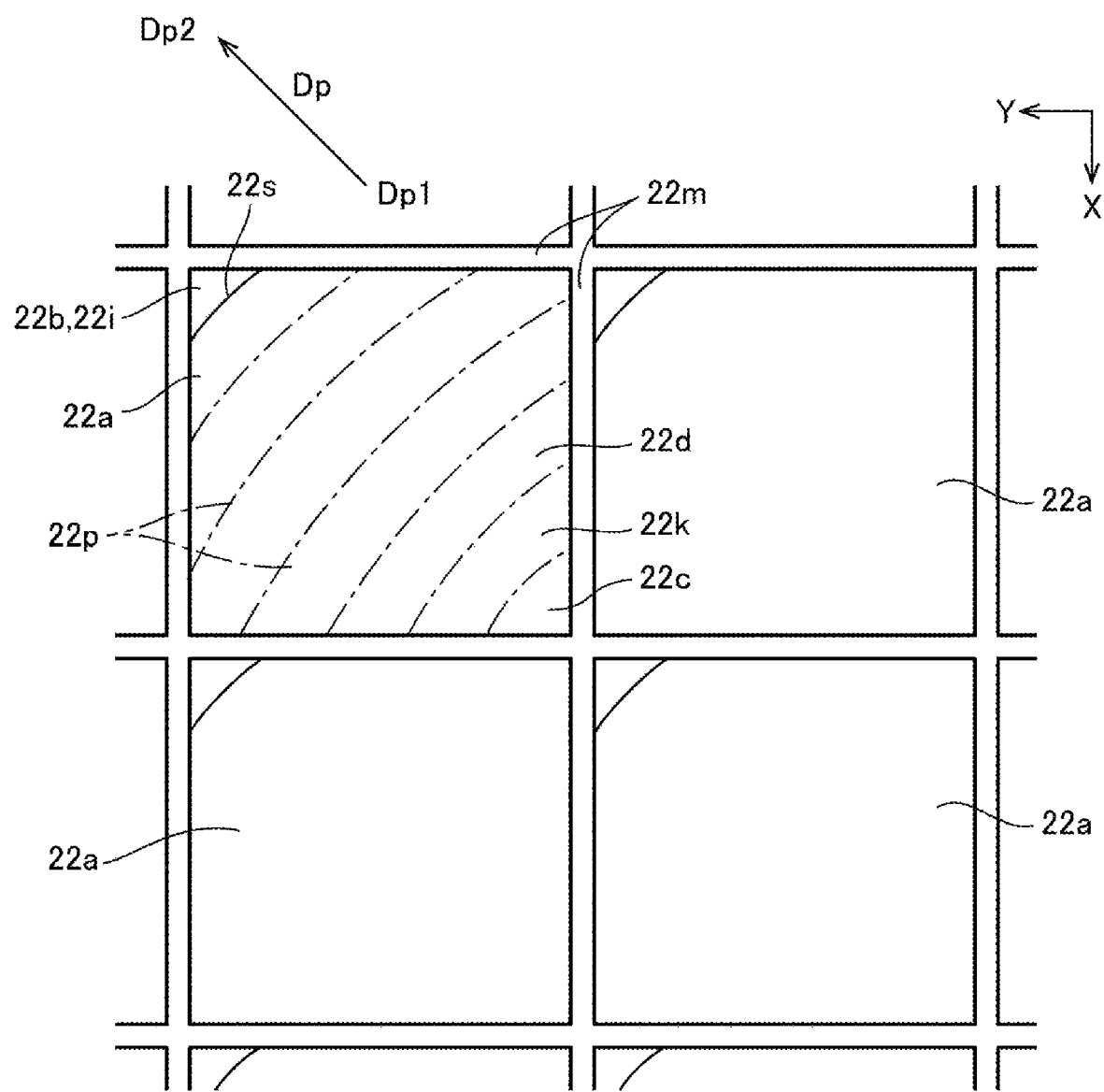
FIG. 7 is an explanatory view illustrating a plane structure of first inclined surfaces of a base layer illustrated in FIG. 5.
Figure 8:
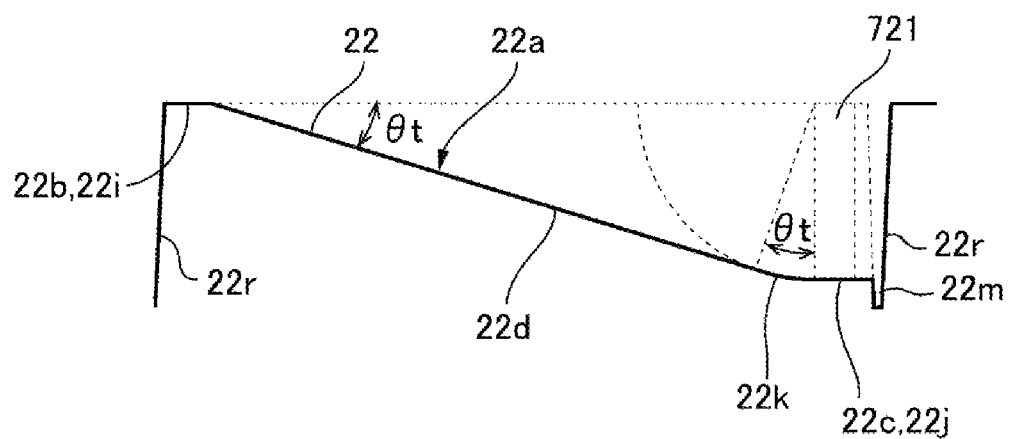
FIG. 8 is an explanatory view illustrating a cross-sectional structure of one of the first inclined surfaces of the base layer illustrated in FIG. 5.

FIG. 5 is an explanatory view of the optical compensation layer 25, for example, of the liquid crystal apparatus 100 illustrated in FIG. 1. FIG. 6 is an explanatory view illustrating a shape of the optical compensation layer 25 illustrated in FIG. 7. FIG. 7 is an explanatory view illustrating a plane structure of first inclined surfaces 22a of the base layer 22 illustrated in FIG. 5. FIG. 8 is an explanatory view illustrating a cross-sectional structure of one of the first inclined surfaces 22a of the base layer 22 illustrated in FIG. 5.

As illustrated in FIG. 5, the second substrate 20 of the liquid crystal apparatus 100 according to the exemplary embodiment is formed with the base layer 22 (base layer), the optical compensation layer 25, and the light-transmission layer 24 in order. The base layer 22 and the optical compensation layer 25 are transmissive.

As illustrated in FIGS. 5 and 6, a surface of the base layer 22 faces the first substrate 10, is formed with the plurality of first inclined surfaces 22a, and is laminated with the optical compensation layer 25. The optical compensation layer 25 is formed to have a substantially constant film thickness. A surface of the optical compensation layer 25 faces the first substrate 10 and is formed with a plurality of second inclined surfaces 25a having a shape reflected with a shape of the plurality of first inclined surfaces 22a of the base layer 22. The light-transmission layer 24 is laminated on the surface, facing the first substrate 10, of the optical compensation layer 25. A surface of the light-transmission layer 24 faces the first substrate 10 and is flat. The first inclined surfaces 22a and the second inclined surfaces 25a respectively have quadrangular flat shapes overlapping the first electrodes 9a when viewed in a plan view. The base layer 22 and the light-transmission layer 24 are made from silicon oxide films. The optical compensation layer 25 is a multi-layer film alternately laminated with a low-refractive index layer such as a silicon oxide film and a high-refractive index layer such as a tantalum oxide film, a niobium oxide film, a titanium oxide film, a silicon nitride film, or a silicon oxynitride film.

As illustrated in FIG. 5, the pre-tilt angle θp of the liquid crystal molecules 85 is set to allow the long axis direction 85a to form an angle of 90° with respect to the second inclined surfaces 25a. Therefore, on each of the first inclined surfaces 22a of the base layer 22, a low portion 22c having a minimum height when viewed from the second substrate 20 lies on an upstream side Dp1 in the pre-tilt orientation Dp. A high portion 22b having a maximum height when viewed from the second substrate 20 lies on a downstream side Dp2 in the pre-tilt orientation Dp. In the exemplary embodiment, as illustrated in FIG. 1, the pre-tilt orientation Dp heads from 0130 o'clock to 0730 o'clock. The pre-tilt orientation Dp intersects with the first direction X and the second direction Y, respectively, at an angle of 45°. Therefore, the plurality of first inclined surfaces 22a each have the quadrangular flat shape having the high portion 22b and the low portion 22c at diagonal positions.

As illustrated in FIGS. 5, 6, 7, and 8, the base layer 22 is provided with boundary grooves 22m formed vertically or substantially vertically each between adjacent ones of the first inclined surfaces 22a. The plurality of first inclined surfaces 22a each have a first flat portion 22j on the low portion 22c. Between the first flat portion 22j and the high portion 22b, an inclined portion 22d having a height continuously changing is present. The plurality of first inclined surfaces 22a each have a curved surface portion 22k having a concave shape between the first flat portion 22j and the inclined portion 22d.

In the exemplary embodiment, the plurality of first inclined surfaces 22a each have a second flat portion 22i on the high portion 22b. Between the second flat portion 22i and the first flat portion 22j, the inclined portion 22d continuously changes its height. On the inclined portion 22d, contour lines 22p respectively coupling positions identical to each other in height are respectively curved into arc shapes about the low portion 22c. Therefore, a boundary portion 22s between the second flat portion 22i and the inclined portion 22d is curved into an arc shape about the low portion 22c.

As described above, in the liquid crystal apparatus 100 according to the exemplary embodiment, wall surfaces 22r respectively lying opposite to the first inclined surfaces 22a with respect to the high portions 22b are defined by side walls of the boundary grooves 22m. The side walls of the boundary grooves 22m respectively stand vertically or substantially vertically with respect to the first substrate 10. Therefore, the wall surfaces 22r respectively lying opposite to the inclined portions 22d with respect to the high portions 22b would be less likely to become slopes inclined opposite to the inclined portions 22d. Thus, when the optical compensation layer 25 is laminated onto the base layer 22, the optical compensation layer 25 keeps an appropriate shape. In the exemplary embodiment, the optical compensation layer 25 can appropriately compensate elliptically polarized light components.

Method for Producing Liquid Crystal Apparatus 100

Figure 9:
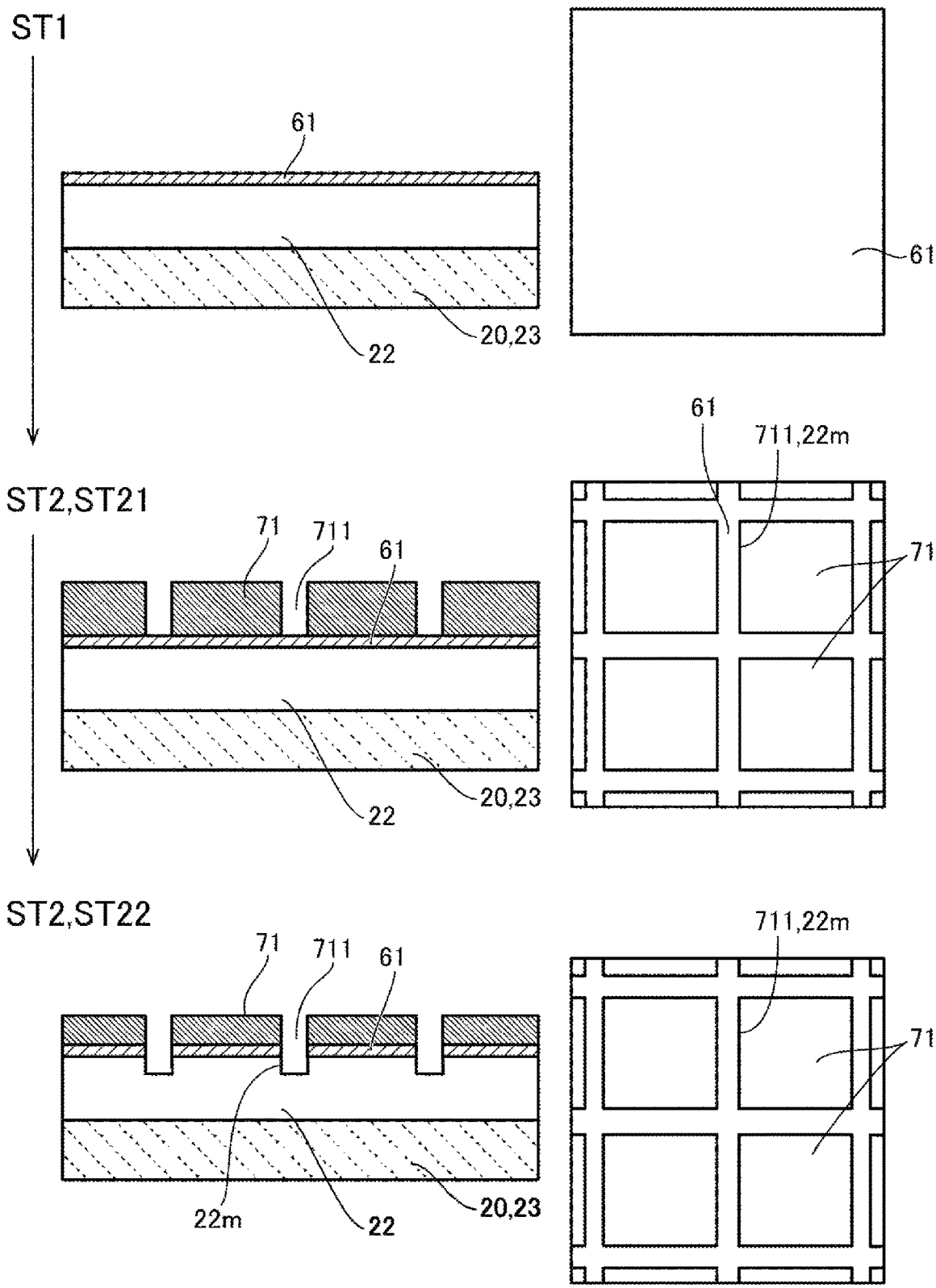
FIG. 9 is an explanatory view illustrating a method for producing the liquid crystal apparatus illustrated in FIG. 1.
Figure 10:
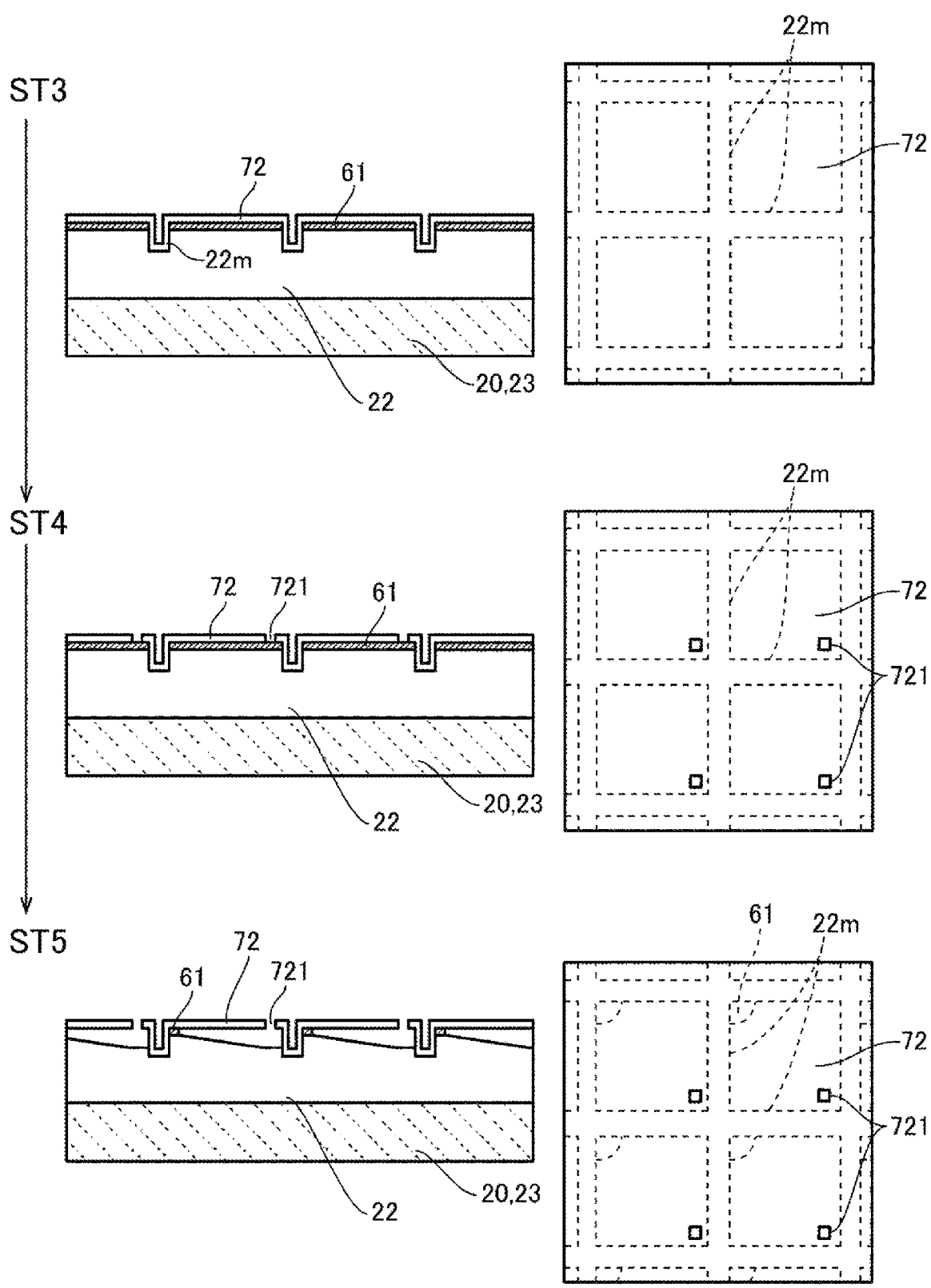
FIG. 10 is an explanatory view illustrating the method for producing the liquid crystal apparatus illustrated in FIG. 1.
Figure 11:
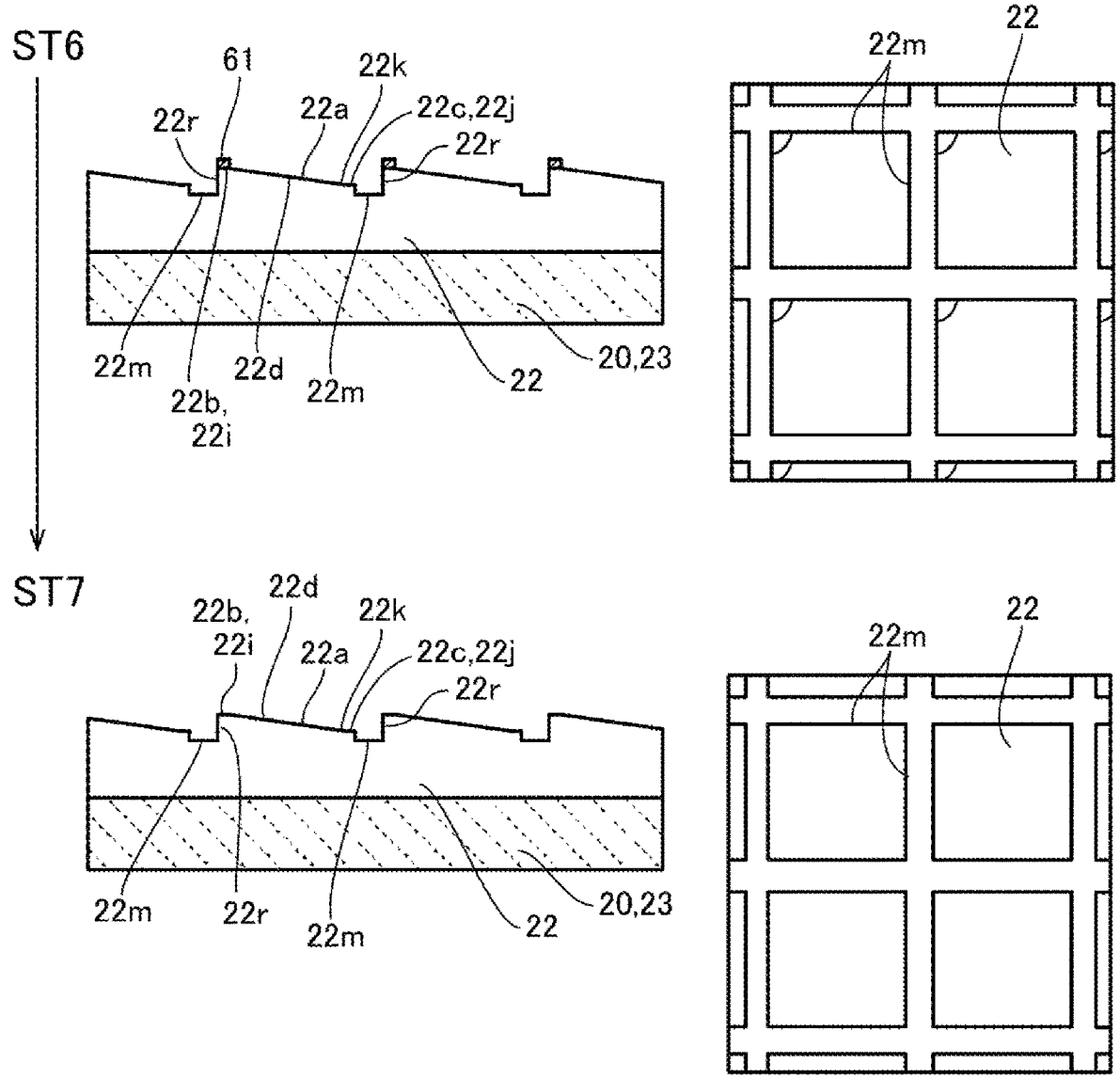
FIG. 11 is an explanatory view illustrating the method for producing the liquid crystal apparatus illustrated in FIG. 1.
Figure 12:
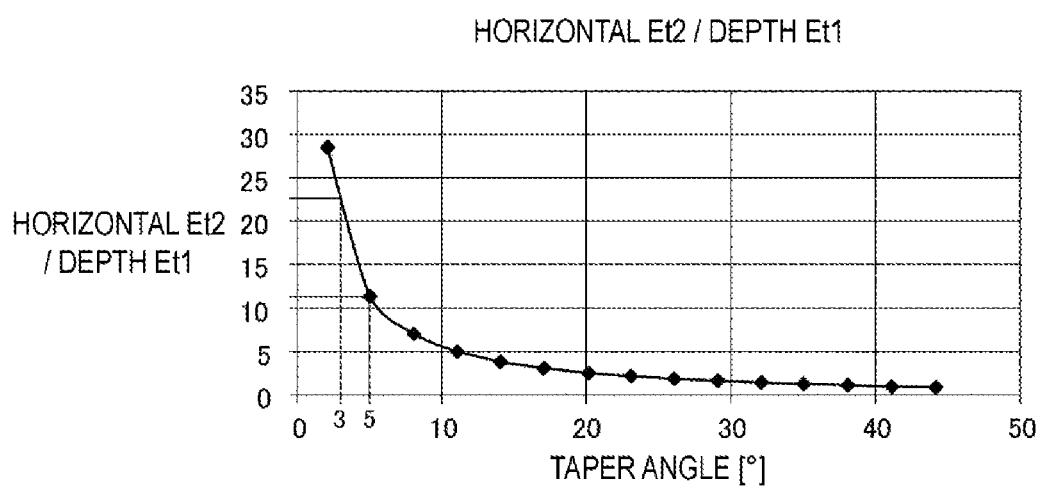
FIG. 12 is a graph illustrating a relationship between a ratio between an etching speed in a depth direction and an etching speed in a horizontal direction in a fifth process illustrated in FIG. 10 and a taper angle of an inclined portion.

FIGS. 9 to 11 are explanatory views illustrating a method for producing the liquid crystal apparatus 100 illustrated in FIG. 1. FIG. 12 is a graph illustrating a relationship between a ratio Et1/Et2 between an etching speed Et1 in a depth direction and an etching speed Et2 in a horizontal direction in a fifth process ST5 illustrated in FIG. 10 and a taper angle θt of the inclined portion 22d. FIGS. 9 to 11 illustrate, on the left, process cross-sectional views taken along a line coupling the high portion 22b and the low portion 22c. FIGS. 9 to 11 illustrate, on the right, plan views.

Among processes for producing the liquid crystal apparatus 100 according to the exemplary embodiment, to form the optical compensation layer 25, for example, onto the second substrate 20, an optical compensation layer forming process and other processes start from a first process ST1 described below. Specifically, in the first process ST1 illustrated in FIG. 9, the surface 20s of the second substrate 20 is first film-formed with the base layer 22 made from a silicon oxide film, for example, and a first sacrificing layer 61 made from a silicon oxynitride film, for example.

Next, in a second process ST2 illustrated in FIG. 9, a resist mask 71 is formed on a surface of the first sacrificing layer 61 in a resist mask forming process ST21. After that, in a dry etching process ST22, the base layer 22 is dry-etched from the first sacrificing layer 61 via opening portions 711 of the resist mask 71 to form the plurality of boundary grooves 22m extending in the two directions intersecting with each other. After that, the resist mask 71 is removed. In the exemplary embodiment, the boundary grooves 22m are formed through anisotropic dry etching. Therefore, the side walls of the boundary grooves 22m stand vertically or substantially vertically.

Next, in a third process ST3 illustrated in FIG. 10, a mask layer 72 covering the surface of the first sacrificing layer 61 and inner walls of the boundary grooves 22m is formed. The mask layer 72 is a hard mask made from an inorganic film. The mask layer 72 is made from a polysilicon film, for example.

Next, in a fourth process ST4 illustrated in FIG. 10, the mask layer 72 is formed with openings 721 around ends of areas surrounded by the plurality of boundary grooves 22m.

Next, in the fifth process ST5 illustrated in FIG. 10, the first sacrificing layer 61 and the base layer 22 are wet-etched from the openings 721 under a condition that an etching speed for the first sacrificing layer 61 is greater than an etching speed for the base layer 22 to form the inclined portions 22d onto the base layer 22. On the inclined portions 22d, heights from the second substrate 20 respectively continuously increase from positions adjacent to the openings 721 to positions away from the openings 721. At that time, in the exemplary embodiment, the first sacrificing layer 61 at positions respectively most distant from the openings 721 is left behind in the areas surrounded by the plurality of boundary grooves 22m.

As a result, as illustrated in FIG. 8, between the base layer 22 and the mask layer 72, the first sacrificing layer 61 is etched from positions overlapping the openings 721 and serving as starting points. At that time, in the base layer 22, the etching advances at positions exposed from the first sacrificing layer 61 to form the first inclined surfaces 22a. At that time, the portions respectively formed overlapping the openings 721 become the low portions 22c of the first inclined surfaces 22a. The low portions 22c serve as the first flat portions 22j. On the base layer 22, portions with the first sacrificing layer 61 left behind at the positions respectively most distant from the openings 721 become the high portions 22b of the first inclined surfaces 22a. The high portions 22b serve as the second flat portions 22i. For the inclined portion 22d, etching advances from the positions respectively serving as the starting points and overlapping the openings 721. On the inclined portions 22d, the contour lines 22p respectively coupling positions identical to each other in height are respectively curved into arc shapes about the low portions 22c. Therefore, the boundary portions 22s respectively between the second flat portions 22i and the inclined portions 22d are curved into arc shapes about the low portions 22c. Between each of the first flat portions 22j and each of the inclined portions 22d, etching advances to form an arc surface about each of the openings 721. Therefore, the curved surface portions 22k respectively having concave shapes are each formed between each of the first flat portions 22j and each of the inclined portions 22d. On the base layer 22, some areas of the inner walls of the boundary grooves 22m remain. Therefore, the boundary grooves 22m each remain between adjacent ones of the first inclined surfaces 22a. Therefore, the wall surfaces 22r respectively lying opposite to the inclined portions 22d with respect to the high portions 22b correspond to the inner walls of the boundary grooves 22m. The wall surfaces 22r respectively would be less likely to become slopes greatly inclined opposite to the inclined portions 22d.

Next, in a sixth process ST6 illustrated in FIG. 11, the mask layer 72 is removed through dry etching. Next, in the optical compensation layer forming process, as illustrated in FIG. 5, the surface of the base layer 22 is laminated with the optical compensation layer 25. In the exemplary embodiment, in a seventh process ST7 illustrated in FIG. 11 between the sixth process ST6 and the optical compensation layer forming process, the first sacrificing layer 61 is removed from the surface of the base layer 22 through wet etching. As a result, the portions covered by the first sacrificing layer 61 become the high portions 22b, i.e., the second flat portions 22i. When the first sacrificing layer 61 is removed through wet etching in the seventh process ST7, the surface of the base layer 22 is also etched.

In the exemplary embodiment, the first sacrificing layer 61 is removed in the seventh process ST7. However, the seventh process ST7 may be omitted, and the first sacrificing layer 61 may be left behind at the high portions 22b.

In the production method, when wet etching is performed in the fifth process ST5 illustrated in FIG. 10, by changing the ratio Et1/Et2 between the etching speed Et1 in the depth direction and the etching speed Et2 in the horizontal direction, as illustrated in FIG. 12, the taper angle θt of the inclined portions 22d can be changed. That is, by reducing the ratio Et1/Et2 between the etching speed Et1 in the depth direction and the etching speed Et2 in the horizontal direction, the taper angle θt of the inclined portions 22d can be reduced. In the exemplary embodiment, the pre-tilt angle θp ranges from approximately 3° to approximately 5°. For example, by setting the ratio Et1/Et2 to a value ranging from 12 to 23, the taper angle θt of the inclined portions 22d can be set to a value ranging from approximately 3° to approximately 5°.

As described above, in the method for producing the liquid crystal apparatus 100, after the first sacrificing layer 61 is film-formed onto the base layer 22 of the second substrate 20 in the first process ST1, the base layer 22 is etched from the first sacrificing layer 61 in the second process ST2 to form the plurality of boundary grooves 22m extending in the two directions intersecting with each other. After the mask layer 72 is formed in the third process ST3, the openings 721 are formed on the mask layer 72 around the ends of the areas surrounded by the plurality of boundary grooves 22m in the fourth process ST4. In the fifth process ST5, the first sacrificing layer 61 and the base layer 22 are wet-etched from the openings 721 to form the first inclined surfaces 22a. At that time, the first sacrificing layer 61 at the positions respectively most distant from the openings 721 is left behind. Therefore, the first flat portions 22j are respectively formed on the high portions 22b of the first inclined surfaces 22a. Therefore, different from a case when, after a gray scale mask, for example, is used to form a resist having triangular shapes in cross section onto a surface of a base layer, etching is performed, such an event would be less likely to occur that the wall surfaces 22r respectively lying opposite to the first inclined surfaces 22a with respect to the high portions 22b become slopes greatly inclined opposite to the first inclined surfaces 22a. Thus, the optical compensation layer 25 keeping an appropriate shape can be provided. Elliptically polarized light components can be appropriately compensated.

As illustrated in FIG. 12, however, within the range of the ratio Et1/Et2 from 12 to 23, the pre-tilt angle θp varies greatly. Therefore, after the ratio Et1/Et2 is reduced to increase the taper angle θt greater than an optimum value, a taper angle adjustment process described below with reference to FIG. 13 may be performed to adjust the taper angle θt to the optimum value.

Taper Angle Adjustment Process

Figure 13:
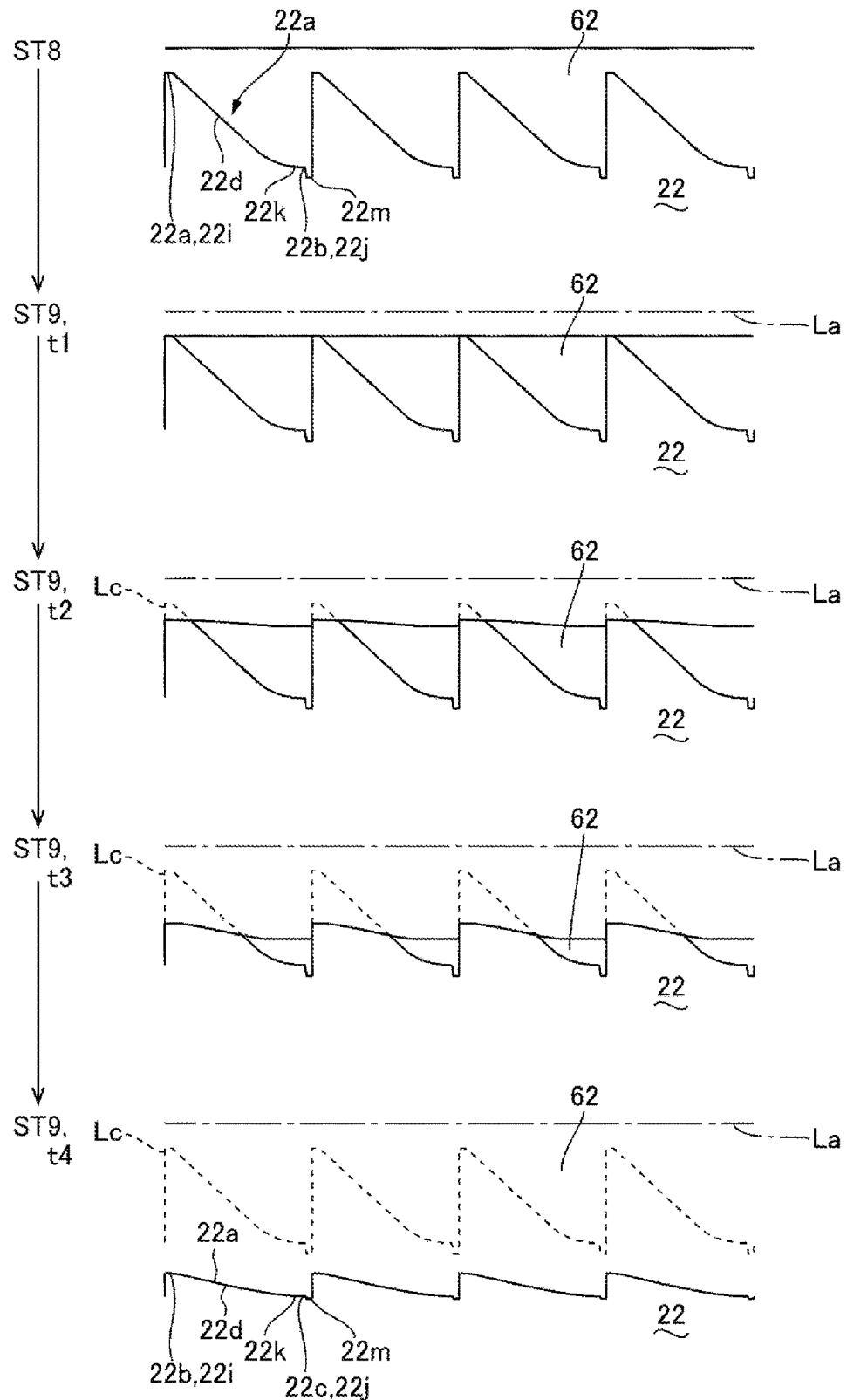
FIG. 13 is an explanatory view of a taper angle adjustment process configured to adjust a taper angle illustrated in FIG. 8.
Figure 14A:
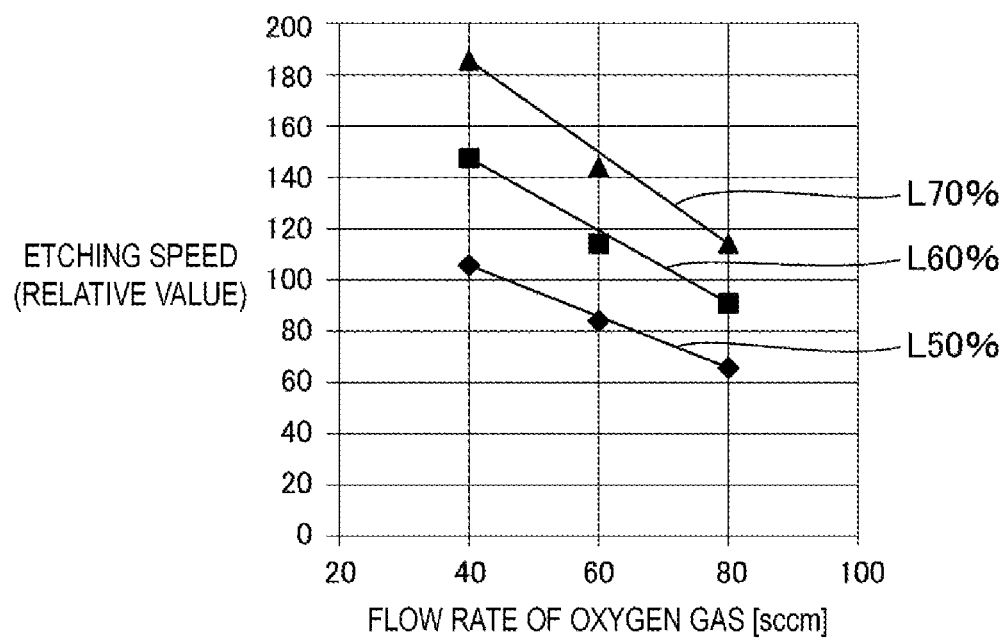
FIG. 14A and FIG. 14B are explanatory views illustrating a change in etching speed for a second sacrificing layer illustrated in FIG. 13.
Figure 14B:
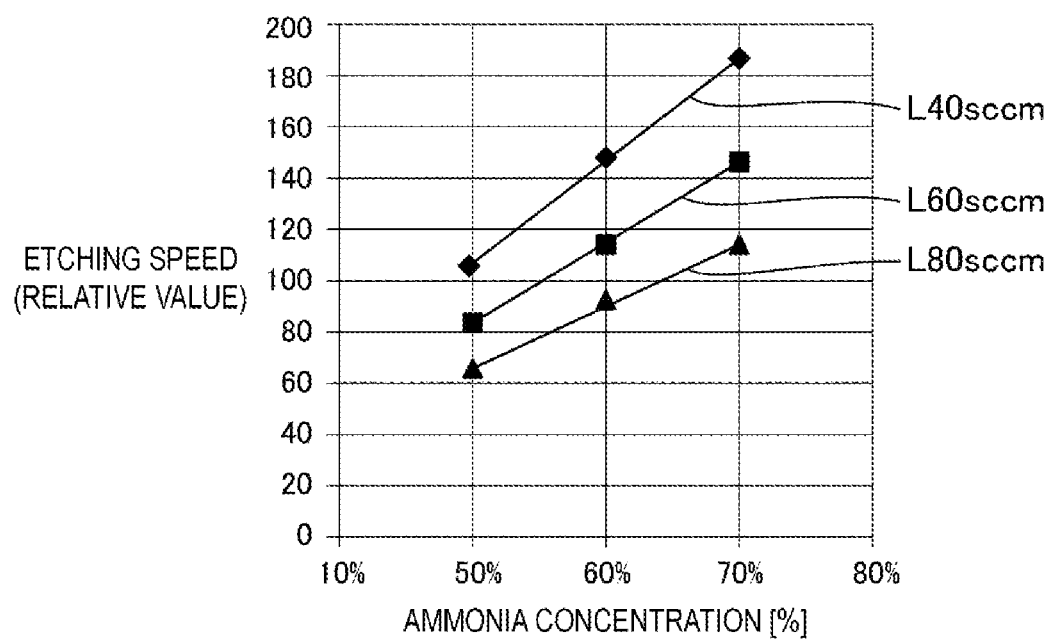

FIG. 13 is an explanatory view of the taper angle adjustment process configured to adjust the taper angle θt illustrated in FIG. 8. FIG. 14 is an explanatory view illustrating a change in etching speed for a second sacrificing layer 62 illustrated in FIG. 13. In FIG. 13, how etching advances in a ninth process ST9 is rendered with a solid line. A position of the surface of the second sacrificing layer 62 before etching is rendered with a dotted line La. A position of the surface of the base layer 22 before etching is rendered with a dotted line Lc.

The taper angle adjustment process takes place between the sixth process ST6 illustrated in FIG. 11, for example, and the optical compensation layer forming process. More specifically, after the seventh process ST7 illustrated in FIG. 11, for example, in an eighth process ST8 illustrated in FIG. 13, the surface of the base layer 22 formed with the first inclined surfaces 22a having the taper angle θt of 20° is formed with the second sacrificing layer 62. The second sacrificing layer 62 has a flat surface. A film thickness each at the high portions 22b of the first inclined surfaces 22a of the base layer 22 is 1 μm, for example. In the exemplary embodiment, after a silicon oxynitride film, for example, is formed, a surface is polished, for example, into a flat surface to form the second sacrificing layer 62. After a liquid material such as a resist is applied, the liquid material may be allowed to harden to form the second sacrificing layer 62.

Next, in the ninth process ST9 illustrated in FIG. 13, the second sacrificing layer 62 and the base layer 22 are etched under a condition that an etching speed for the second sacrificing layer 62 is greater than an etching speed for the base layer 22. As the ninth process ST9 proceeds, the second sacrificing layer 62 and the base layer 22 are etched. As a result, the taper angle θt of the inclined portions 22d of the first inclined surfaces 22a falls within a range from approximately 3° to approximately 5°.

More specifically, in the ninth process ST9, the second sacrificing layer 62 is only etched until a time t1. At a time t2, the second sacrificing layer 62 and the high portions 22b of the first inclined surfaces 22a are etched. At a time t3, the inclined portions 22d of the first inclined surfaces 22a are etched. At a time t4, the second sacrificing layer 62 is fully removed. Meanwhile the first inclined surfaces 22a are wholly etched.

In the exemplary embodiment, the second sacrificing layer 62 and the base layer 22 are dry-etched under a condition that an etching speed for the second sacrificing layer 62 is approximately 30% greater than an etching speed for the base layer 22. For example, when a silicon oxynitride film formed with a raw material gas such as silane, nitrous oxide, and ammonia through a plasma chemical vapor deposition (CVD) method is used as the second sacrificing layer 62, an etching speed when the second sacrificing layer 62 is dry-etched changes as illustrated in FIG. 14. FIG. 14 illustrates a change in etching speed for the second sacrificing layer 62 when concentration of an ammonia gas when the second sacrificing layer 62 is film-formed and a flow rate of an oxygen gas when dry etching is performed are changed. More specifically, FIG. 14 illustrates with solid lines L50%, L60%, and L70% a relationship (a) between flow rate of oxygen gas during dry etching and etching speed when the concentration of the ammonia gas during film-forming is changed to 50%, 60%, and 70%. FIG. 14 further illustrates with solid lines L40 sccm, L60 sccm, and L80 sccm a relationship (b) between concentration of ammonia gas during film-forming and etching speed when the flow rate of the oxygen gas during dry etching is changed to 40 sccm, 60 sccm, and 80 sccm.

As can be seen from FIG. 14, when the concentration of the ammonia gas during film-forming is set to 50%, 60%, and 70%, the etching speed linearly reduces with respect to the flow rate of the oxygen gas during dry etching. When the flow rate of the oxygen gas during dry etching is set to 40 sccm, 60 sccm, and 80 sccm, the etching speed linearly increases with respect to the concentration of the ammonia gas during film-forming. Therefore, by appropriately setting the concentration of the ammonia gas during film-forming and the flow rate of the oxygen gas during dry etching, a ratio in etching speed between the base layer 22 and the second sacrificing layer 62 can be appropriately set.

Figure 15:
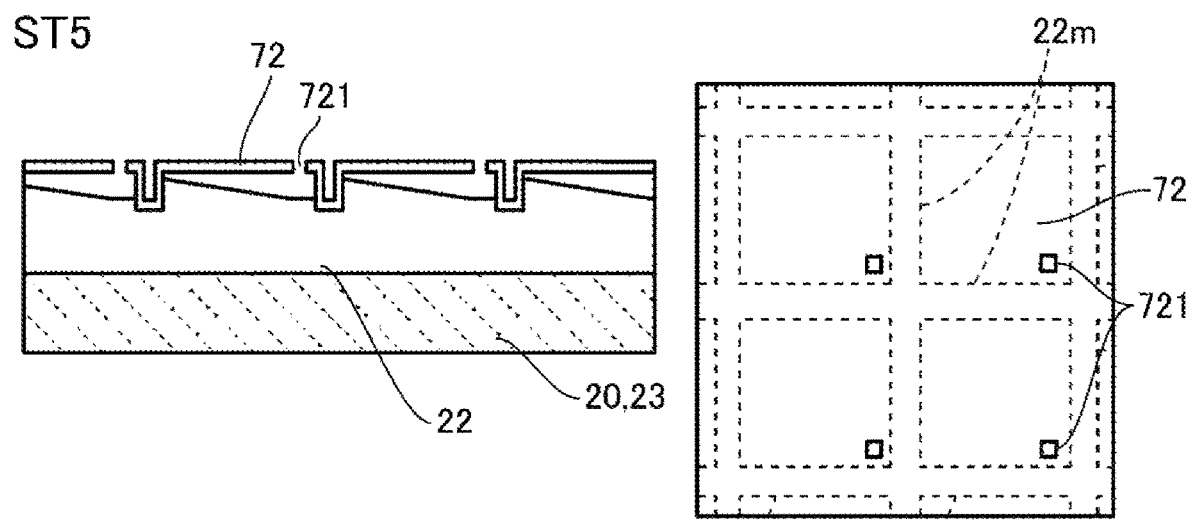
FIG. 15 is an explanatory view illustrating the fifth process in the method for producing the liquid crystal apparatus, according to another exemplary embodiment of the invention.
Figure 16:
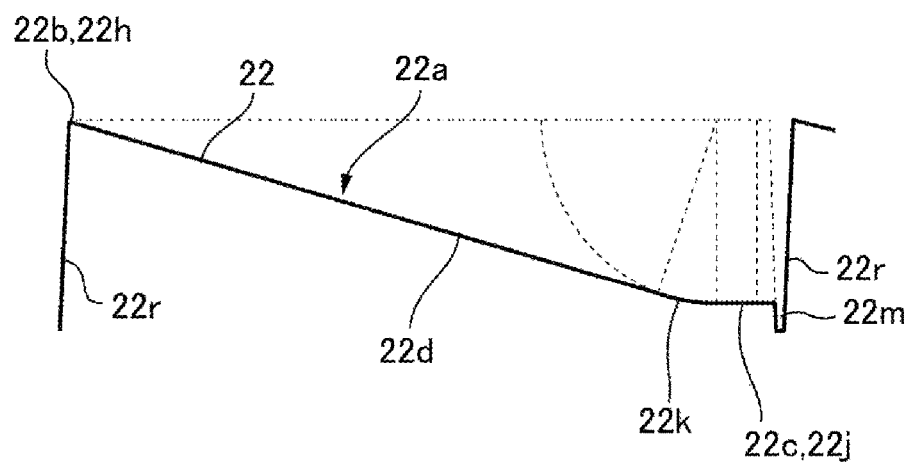
FIG. 16 is an explanatory view of one of the first inclined surfaces formed through the method illustrated in FIG. 15.

FIG. 15 is an explanatory view illustrating a fifth process ST5 in a method for producing a liquid crystal apparatus 100, according to another exemplary embodiment of the invention. FIG. 16 is an explanatory view of one of the first inclined surfaces 22a formed through the method illustrated in FIG. 15. A basic configuration of the exemplary embodiment is identical to the configuration of the method described with reference to FIGS. 9, 10, and 11, excluding an etching time in the fifth process ST5.

Specifically, in the exemplary embodiment, as illustrated in FIG. 15, in the fifth process ST5, when the first sacrificing layer 61 and the base layer 22 are wet-etched from the openings 721 under a condition that an etching speed for the first sacrificing layer 61 is greater than an etching speed for the base layer 22, the first sacrificing layer 61 at positions most distant from openings 721 is removed. As a result, as illustrated in FIG. 16, the high portions 22b are respectively formed with sharp tip portions 22h on areas extended from the inclined portions 22d. Therefore, the inclined portions 22d can be advantageously expanded in area.

Still Another Exemplary Embodiment

Figure 17:
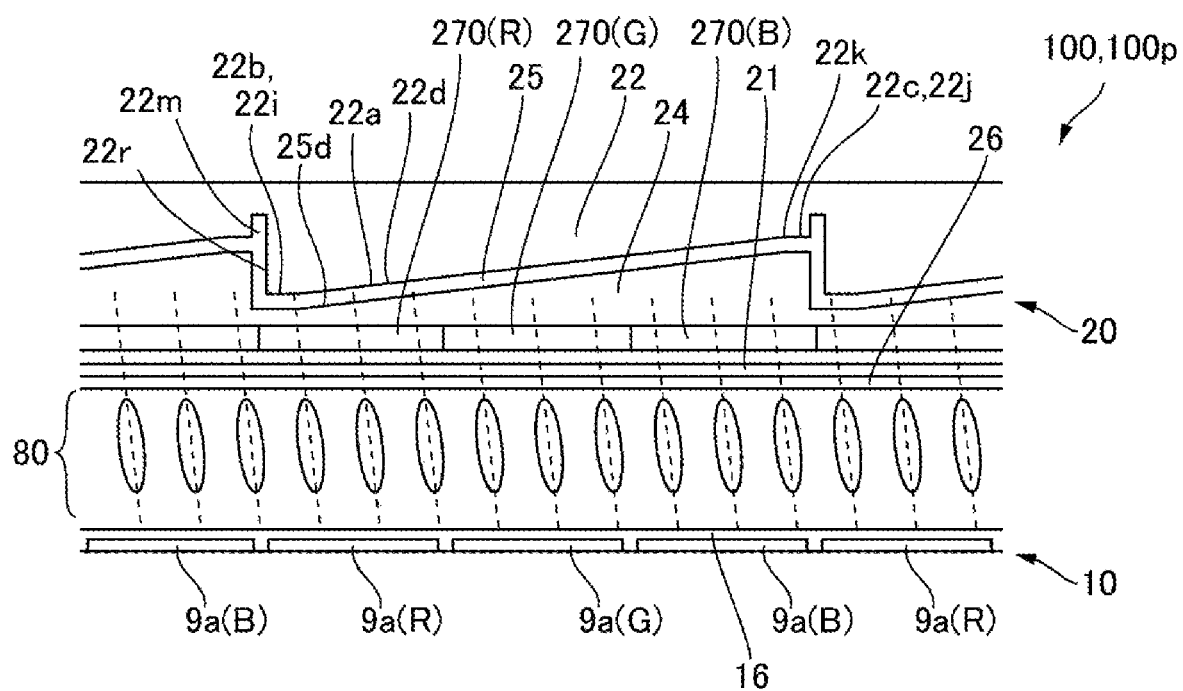
FIG. 17 is an explanatory view of a liquid crystal apparatus according to still another exemplary embodiment of the invention.

FIG. 17 is an explanatory view of a liquid crystal apparatus 100 according to still another exemplary embodiment of the invention. In the exemplary embodiment described above, each of the first electrodes 9a is provided with each of the first inclined surfaces 22a. However, depending on arrangement of the first electrodes 9a and the pre-tilt orientation Dp, for example, such an aspect may be adopted that each of the first inclined surfaces 22a is provided for some of the plurality of first electrodes 9a.

For example, the liquid crystal apparatus 100 illustrated in FIG. 17 is a direct-viewing type display apparatus including the second substrate 20 provided with color filters 270(R), 270(G), and 270(B) respectively corresponding to red, green, and blue. The first inclined surfaces 22a are respectively provided with first electrodes 9a(R) for red pixels, first electrodes 9a(G) for green pixels, and first electrodes 9a(B) for blue pixels. The invention may be applied to the liquid crystal apparatus 100.

Other Exemplary Embodiments

In the exemplary embodiments described above, the optical compensation layer 25 is provided between the lenses 235 and the second electrode 21. The base layer 22 is thus provided as a base layer for the second substrate 20. However, when the lenses 235 are not provided, or when the optical compensation layer 25 is provided closer to the second substrate 20 than the lenses 235, the surface 20s itself of the second substrate 20 may be formed with the first inclined surfaces 22a serving as the base layer.

In the exemplary embodiments described above, on the second substrate 20 formed with the optical compensation layer 25, the second electrode 21 serves as the common electrode, while the first electrodes 9a of the first substrate 10 serve as the first electrodes 9a. However, the invention may be applied to a configuration where pixel electrodes serving as second electrodes are provided on the second substrate 20 formed with the optical compensation layer 25, while the first substrate 10 is provided with the second electrode 21 serving as a first electrode. In the exemplary embodiments described above, the liquid crystal apparatus 100 is a transmissive type. However, the invention may be applied when the liquid crystal apparatus 100 is a reflective type.

Installation Example for Electronic Apparatus

Figure 18:
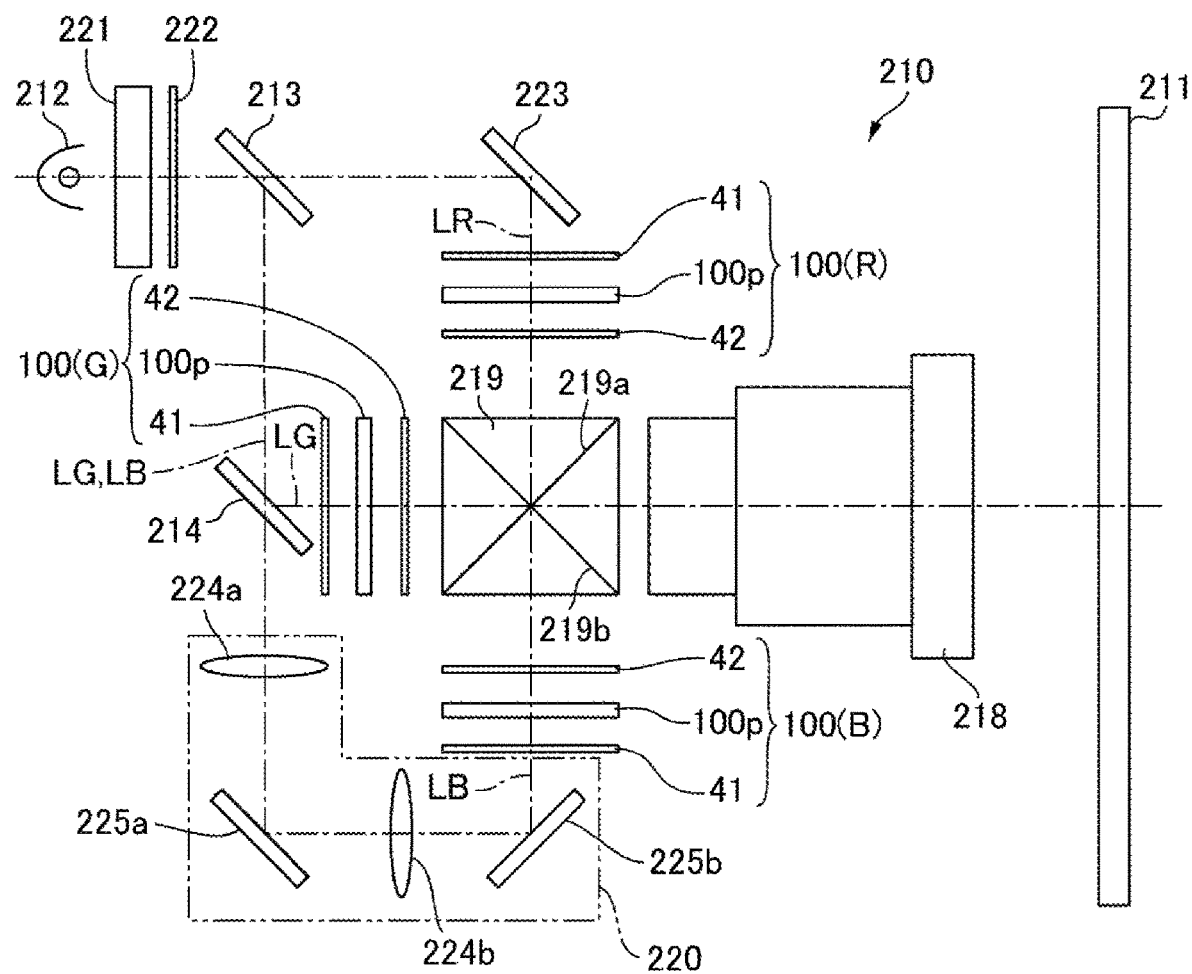
FIG. 18 is a schematic block diagram illustrating a projection-type display apparatus (electronic apparatus) employing the liquid crystal apparatus to which the invention is applied.

FIG. 18 is a schematic block diagram of a projection-type display apparatus (electronic apparatus) employing the liquid crystal apparatus 100 to which the invention is applied. As described below, a plurality of liquid crystal apparatuses 100(R), (G), and (B) configured to supply light varying in wavelength region are used. In the liquid crystal apparatuses 100(R), (G), and (B), the liquid crystal apparatuses 100 to which the invention is applied are used.

A projection-type display apparatus 210 illustrated in FIG. 18 is a forward projection type projector configured to project an image on a screen 211 provided in front of the projector. The projection-type display apparatus 210 includes a light source 212, dichroic mirrors 213 and 214, the liquid crystal apparatuses 100(R), (G), and (B), a projection optical system 218, a cross dichroic prism 219, and a relay system 220. The liquid crystal apparatuses 100(R), (G), and (B) each include a first polarized light element 41, the liquid crystal panel 100p, and a second polarized light element 42.

The light source 212 is an extra-high pressure mercury lamp configured to supply light including red light, green light, and blue light, for example. The dichroic mirror 213 is configured to allow red light LR from the light source 212 to pass through, as well as to reflect green light LG and blue light LB. The dichroic mirror 214 is configured to allow, among the green light LG and the blue light LB reflected by the dichroic mirror 213, the blue light LB to pass through, as well as to reflect the green light LG. As described above, the dichroic mirrors 213 and 214 configure a color separation optical system configured to separate light emitted from the light source 212 into the red light LR, the green light LG, and the blue light LB. Between the dichroic mirror 213 and the light source 212, an integrator 221 and a polarization conversion element 222 are disposed in order from the light source 212. The integrator 221 is configured to evenly distribute light emitted from the light source 212. The polarization conversion element 222 is configured to convert light emitted from the light source 212 into polarized light in a certain vibration direction such as "s" polarized light, for example.

The liquid crystal apparatus 100(R) is configured to modulate, in accordance with an image signal, the red light LR passed through the dichroic mirror 213 and reflected by the reflecting mirror 223. The red light LR entered into the liquid crystal apparatus 100(R) passes through the first polarized light element 41 and is converted into "s" polarized light, for example. The liquid crystal panel 100p is configured to convert the "s" polarized light being entered into "p" polarized light through modulation in accordance with an image signal (for half tone, circularly polarized light or elliptically polarized light). Further, the second polarized light element 42 is configured to block the "s" polarized light, but allow the "p" polarized light to pass through. Therefore, the liquid crystal apparatus 100(R) modulates the red light LR in accordance with an image signal and emits the red light LR being modulated toward the cross dichroic prism 219.

The liquid crystal apparatus 100(G) modulates, in accordance with an image signal, the green light LG reflected by the dichroic mirror 213 and then reflected by the dichroic mirror 214 and emits the green light LG being modulated toward the cross dichroic prism 219.

The liquid crystal apparatus 100(B) modulates, in accordance with an image signal, the blue light LB reflected by the dichroic mirror 213 and passed through the dichroic mirror 214 and then the relay system 220 and emits the blue light LB being modulated toward the cross dichroic prism 219.

The relay system 220 includes relay lenses 224a and 224b and reflecting mirrors 225a and 225b. The relay lenses 224a and 224b are provided to prevent an optical loss in the blue light LB due to its longer optical path. The relay lens 224a is disposed between the dichroic mirror 214 and the reflecting mirror 225a.

The relay lens 224b is disposed between the reflecting mirrors 225a and 225b. The reflecting mirror 225a is disposed to reflect the blue light LB passed through the dichroic mirror 214 and emitted from the relay lens 224a toward the relay lens 224b. The reflecting mirror 225b is disposed to reflect the blue light LB emitted from the relay lens 224b toward the liquid crystal apparatus 100(B).

The cross dichroic prism 219 is a color synthesizing optical system including two dichroic films 219a and 219b disposed to be orthogonal to each other in an X-letter shape. The dichroic film 219a reflects the blue light LB, but allows the green light LG to pass through. The dichroic film 219b reflects the red light LR, but allows the green light LG to pass through.

Therefore, the cross dichroic prism 219 is configured to synthesize the red light LR, the green light LG, and the blue light LB respectively modulated by the liquid crystal apparatuses 100(R), (G), and (B), and to emit the red light LR, the green light LG, and the blue light LB being modulated toward the projection optical system 218. The projection optical system 218 includes a projection lens (not illustrated), and is configured to project light synthesized by the cross dichroic prism 219 on the screen 211.

Such a configuration may be adopted that the liquid crystal apparatuses 100(R) and (B) for red and blue are provided with λ/2 phase difference compensation elements. In this configuration, light emitted from the liquid crystal apparatuses 100(R) and (B) and entering into the cross dichroic prism 219 serves as "s" polarized light. The liquid crystal apparatus 100(G) is not provided with a λ/2 phase difference compensation element. Light emitted from the liquid crystal apparatus 100(G) and entering into the cross dichroic prism 219 serves as "p" polarized light.

By allowing different kinds of polarized light to enter into the cross dichroic prism 219, such a color synthesizing optical system that is optimized by taking into account reflection properties of the dichroic films 219a and 219b can be achieved. The dichroic films 219a and 219b are superior in reflection properties for "s" polarized light in general. Therefore, as described above, the red light LR and the blue light LB reflected by the dichroic films 219a and 219b may serve as "s" polarized light. The green light LG passed through the dichroic films 219a and 219b may serve as "p" polarized light.

Other Projection-Type Display Apparatuses

A projection-type display apparatus may be configured to use, as a light source unit, an LED light source or a laser light source configured to emit light in various colors, and the like to supply light in various colors emitted from the light source to another liquid crystal apparatus.

The liquid crystal apparatus to which the invention is applied may be used, in addition to the electronic apparatus described above, in various electronic apparatuses including projection type head-up displays (HUDs) and direct-viewing type head-mounted displays (HMDs), for example.

The entire disclosure of Japanese Patent Application No. 2018-034412, filed Feb. 28, 2018 is expressly incorporated by reference herein.

What is claimed is:

1. A liquid crystal apparatus comprising:
a first substrate;
a second substrate including:
a base layer having a surface facing the first substrate, the surface of the base layer including:
a plurality of first inclined surfaces, each first inclined surface of the plurality of first inclined surfaces having (i) a high portion with a maximum height relative to the second substrate, (ii) a low portion with a minimum height relative to the second substrate, and (iii) an inclined portion having a continuously changing height relative to the second substrate between the high portion and the low portion, and
a plurality of boundary grooves disposed between adjacent first inclined surfaces of the plurality of first inclined surfaces, each boundary groove of the plurality of boundary grooves extending into the base layer perpendicular with respect to an opposite surface of the base layer, the plurality of boundary grooves having a groove height relative to the second substrate that is less than the minimum height of the low portion, and
an optical compensation layer laminated on the base layer, the optical compensation layer having a surface facing the first substrate, the surface of the optical compensation layer including a plurality of second inclined surfaces having a shape corresponding to a shape of the plurality of first inclined surfaces; and
a liquid crystal layer provided between the first substrate and the second substrate.

2. The liquid crystal apparatus according to claim 1, wherein the inclined portion inclines such that a plurality of contour lines representing the continuous changing height of the inclined portion are curved into arc shapes about the low portion.

3. The liquid crystal apparatus according to claim 1, wherein the plurality of first inclined surfaces each have a first flat portion at the low portion.

4. The liquid crystal apparatus according to claim 3, wherein the plurality of first inclined surfaces each have a curved surface portion having a concave shape between the first flat portion and the inclined portion.

5. The liquid crystal apparatus according to claim 1, wherein the high portion includes a sharp tip portion.

6. The liquid crystal apparatus according to claim 3, wherein the high portion includes a second flat portion.

7. The liquid crystal apparatus according to claim 1, wherein each first inclined surface of the plurality of first inclined surfaces has a square flat shape having the high portion and the low portion at relatively diagonal positions.

8. An electronic apparatus comprising the liquid crystal apparatus according to claim 1.

9. The liquid crystal apparatus according to claim 1, wherein:
   the first substrate includes a plurality of electrodes, and
   each boundary groove of the plurality of boundary grooves is disposed between adjacent electrodes of the plurality of electrodes in a plan view.

10. A liquid crystal apparatus comprising:
   a first substrate;
   a second substrate including:
      a base layer having a surface facing the first substrate, the surface including:
         a plurality of first inclined surfaces, each first inclined surface of the plurality of first inclined surfaces having (i) a high portion with a maximum height relative to the second substrate, (ii) a low portion with a minimum height relative to the second substrate, the low portion including a first flat portion, (iii) an inclined portion having a continuously changing height relative to the second substrate between the high portion and the low portion, and (iv) a curved surface portion with a concave shape between the first flat portion and the inclined portion, and
         a plurality of boundary grooves disposed between adjacent first inclined surfaces of the plurality of first inclined surfaces, and
      an optical compensation layer laminated on the base layer, the optical compensation layer having a surface facing the first substrate, the surface including a plurality of second inclined surfaces having a shape corresponding to a shape of the plurality of first inclined surfaces; and
   a liquid crystal layer provided between the first substrate and the second substrate.

\* \* \* \* \*